Feb. 21, 1961                H. R. HURT                2,972,365
          HORIZONTAL AND VERTICALLY ADJUSTING MEANS FOR
                  MOTOR OPERATED CUTTING TOOLS
Filed Nov. 2, 1959                              2 Sheets-Sheet 1
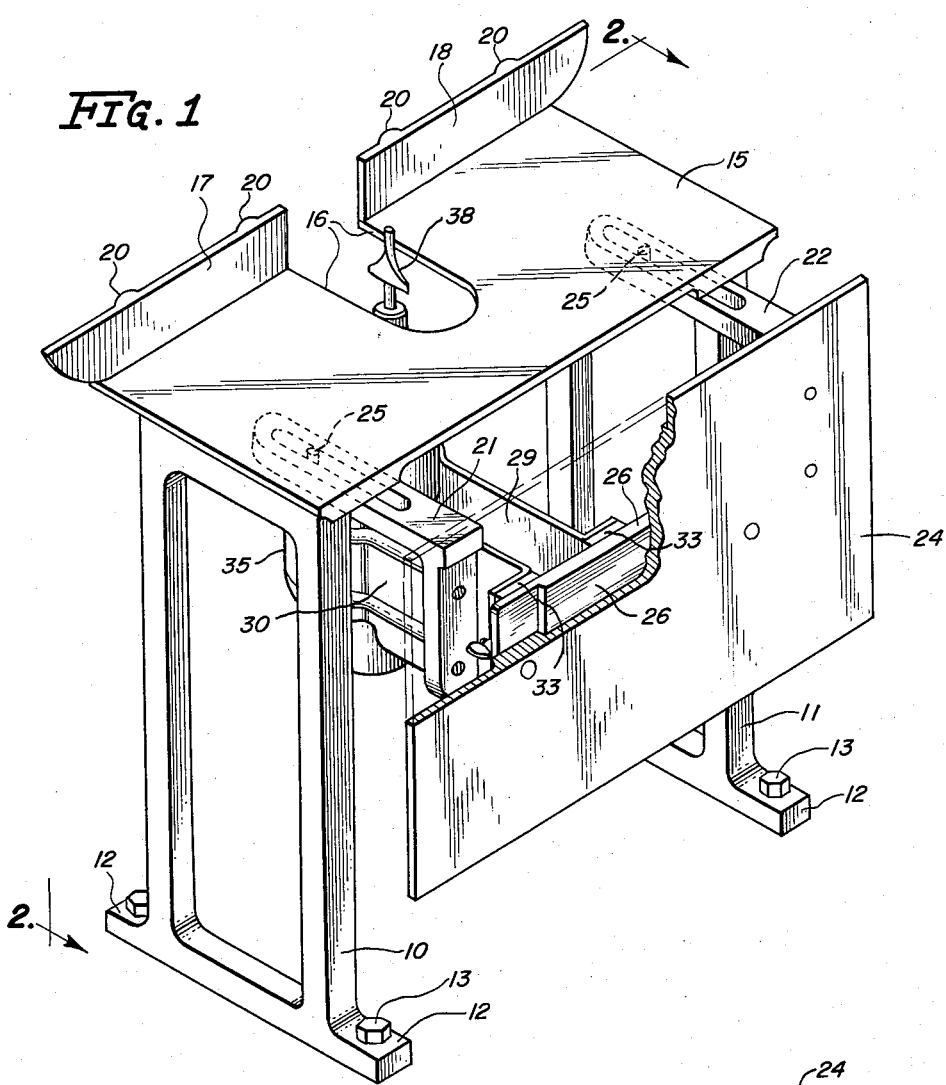
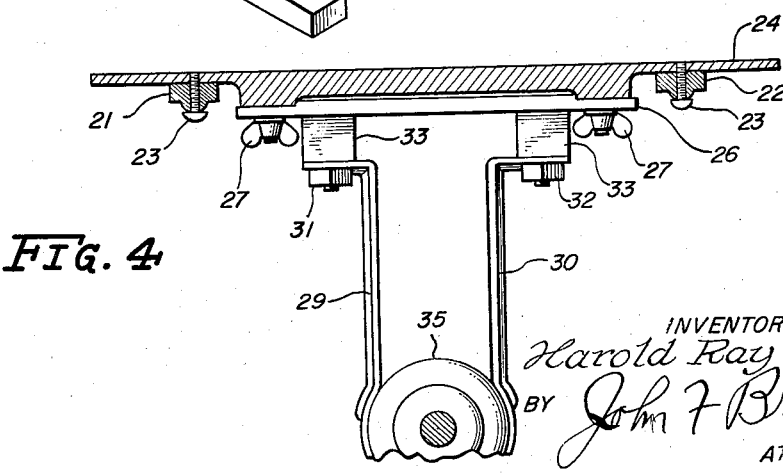
INVENTOR
Harold Ray Hurt
BY John F. Brezina
ATTORNEY

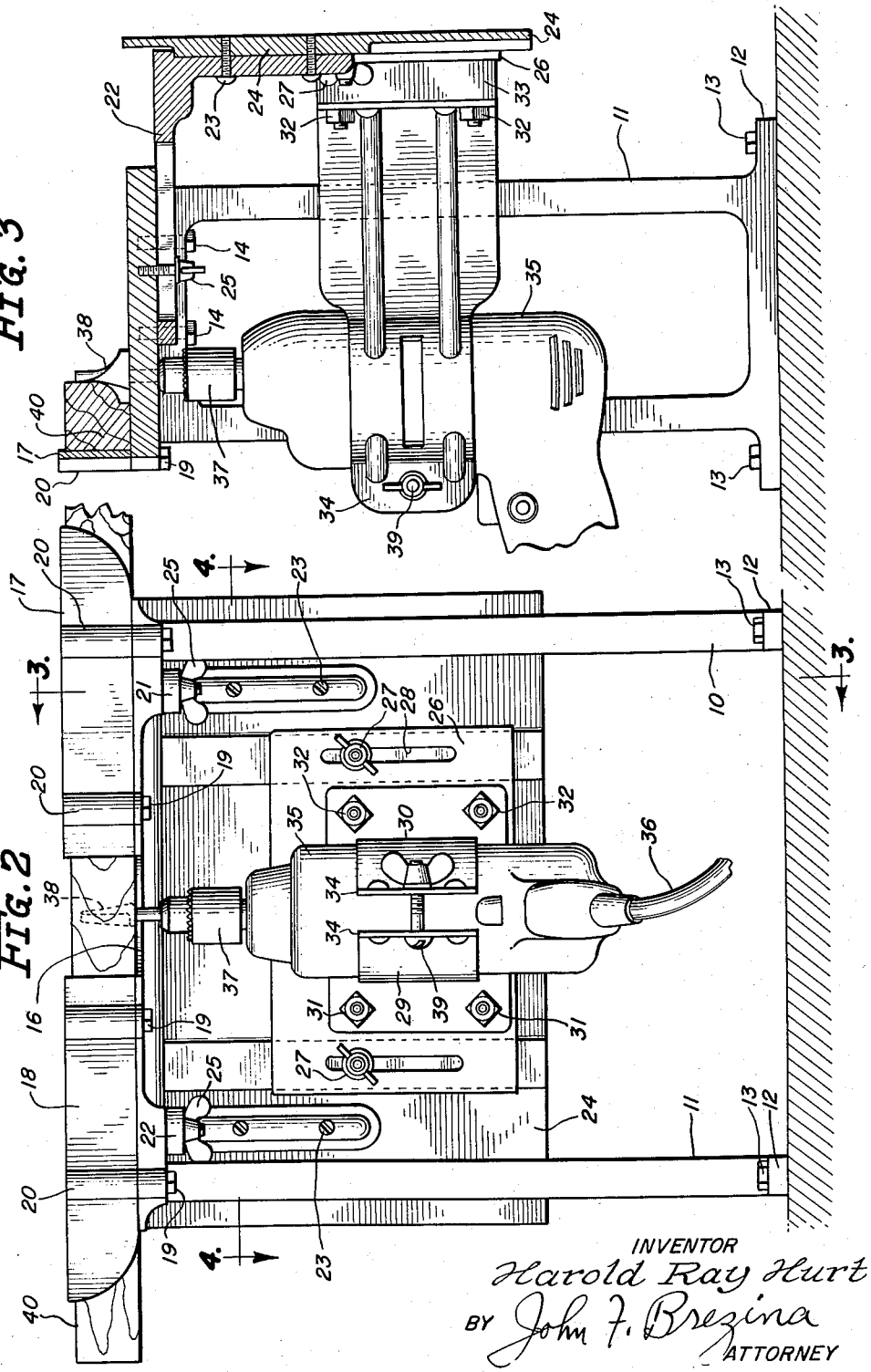

2,972,365
Patented Feb. 21, 1961

2,972,365
HORIZONTAL AND VERTICALLY ADJUSTING MEANS FOR MOTOR OPERATED CUTTING TOOLS

Harold Ray Hurt, Albuquerque, N. Mex.

Filed Nov. 2, 1959, Ser. No. 850,169

2 Claims. (Cl. 144—134)

My invention is directed to a novel adjustable jig for routing and molding and is adapted to adjustably mount and hold an electric motor and various routing and molding tools mounted thereon in varying positions to meet the different requirements of the work to be performed.

It is an important object of my invention to provide an adjustable holding device or jig for routing and molding operations which has novel means for adjustably holding an electric motor in which working tools are mounted at varying heights relative to a work table and having novel adjustable means to hold the motor and driven tool at varying distances from guide plates or fences to provide the proper depth of cutting and also for the proper height of cutting by the driven tool.

It is a further important object of my invention to provide a novel device or jig for holding electric motors and tools driven thereby which has novel adjustable means for setting and holding of the driven tool in varying positions horizontally and in varying positions vertically with respect to a work table and the work pieces to be moved along such table, and which permits said device or jig, with driven tools thereon, to be used either as a joiner, router or shaper.

A further object of my invention is to provide a device for releasably, selectively, and adjustably holding a portable drill in varying positions to drive a working or cutting tool at varying heights relative to a work table and at varying distances from a fence or edge guide so that the proper width of cut and the proper depth of cut for varying operations such as routing and shapings may be accomplished.

Other and further important objects of my invention will be apparent from the following description and appended claims.

On the drawings:

Fig. 1 is a perspective view, with parts broken away, of my novel adjustable jig.

Fig. 2 is a rear elevational view thereof.

Fig. 3 is a cross sectional view thereof on a vertical plane indicated by line 3—3 of Fig. 2.

Fig. 4 is a cross sectional view thereof on a horizontal plane indicated by line 4—4 of Fig. 2.

As shown on the drawings:

As illustrated in Figs. 1, 2 and 3, numerals 10 and 11 designate two substantially rectangular frame-like supports or stands which have horizontally extending integral apertured feet 12, and which said supports are secured at their upper ends by screws 14, as shown in Fig. 3, to substantially secure the opposite end portions of a flat metal work table 15. Said supporting stands 10 and 11 are substantially parallel and in vertical planes as illustrated, and are adapted to be releasably secured to a work bench or other supporting surface by screws 13 as illustrated.

The work table has a relatively deep slot or recess 16 formed therein and opening on the middle portion of one longitudinal edge of said work table, said recess being illustrated in Fig. 1.

A pair of longitudinally spaced aligned edge guide plates or fences 17 and 18 are secured in vertical position on the recessed longitudinal edge of the work table 15, by means of a plurality of screws 19 whose head portions are illustrated in Figs. 2 and 3 and which thread into internally threaded integral bosses 20 formed on the outer faces of the edge guide plates or fences 17 and 18 respectively.

Numerals 21 and 22 designate right angled metal brackets having one leg of each thereof longitudinally slotted as illustrated in Fig. 1. The opposite and normally depending legs of said brackets 21 and 22 have apertures therein, and screws 23 extending through said apertures, as shown in Fig. 4, thread into internally threaded apertures of a vertically extending base plate 24 to thereby hold said base plate in a vertical plane.

As shown in Figs. 2 and 3, threaded thumb screws 25 extend through the slots of the brackets 21 and 22 and adjustably thread into suitably threaded holes respectively formed in the work table 15. Accordingly, said brackets 21 and 22 and said base plate 24 may be adjustably moved horizontally and releasably held at different distances and positions from the work table 15.

As shown in the drawings, an apertured and vertically slotted metal drill mounting base 26 is adjustably and releasably mounted against the normally inside face of the base plate 24 by means of two thumb screws 27, shown in Figs. 2, 3 and 4, said thumb screws 27 extending through the vertical slots 28 respectively and threading into suitably threaded holes (not shown) in the base plate 24. Said drill mounting base 26 accordingly is releasably mounted and also vertically slidable and adjustable within the limits of the slots 28 so that the same may be selectively moved and releasably secured at varying heights.

Numerals 29 and 30 represent a pair of clamps or clamping arms whose inner ends are bent at right angles and apertured, and which are secured by bolts 31 and 32 against the exposed faces of spacer blocks 33 and also secured to the drill mounting base 26, as illustrated in Figs. 3 and 4.

The outer end portions of said clamping arms 29 and 30 are bent arcuately, as illustrated in Figs. 2, 3 and 4, and the extreme end portions of said clamping arms are bent to form apertured integral ears 34, which said ears are illustrated in Figs. 2 and 3. The said clamping arms are preferably formed with intermediate reinforcing webs or ribs, as illustrated in Fig. 3. The outer portions of said clamping arms 29 and 30 are adapted to have releasably clamped and secured therebetween the housing of a portable electric drill or an electric motor 35 which motor has suitably connected thereto an electric supply cord 36, a fragment of which is shown in Fig. 2. A screw 39 with thumb nut thereon extends through the apertures of the ears 34 and normally impinges the arms of said clamp against the motor housing.

The said portable drill or motor 35 is normally clamped into a position so that its driven chuck 37 is a short distance below the recess 16 in work table 15. Any one of a number of suitable tools, such as a shaper bit or routing bit or dadoing cutter, illustrated by the typical bit 38, is adapted to be mounted in chuck 37 to be driven by said motor.

For different cutting, routing and shaping operations, it is important that the cutting or working tool rotated by the motor is positioned and held a the proper height, and also at the proper distance from the edge guide plates or fences 17 and 18, the latter depending upon the width or thickness of the wood piece to be worked upon. When a determination is made of the particular work to be performed on the work piece 40, illustrated in Fig. 3, the operator will first adjust the position of the motor and its driven tool horizontally by releasing thumb screws 25, moving the base plate 24 and brackets 21 and 22 horizontally and retightening the two thumb screws 25. The operator will also adjust the position of the tool and its motor vertically by loosening the thumb screws 27, and sliding vertically the drill mounting base 26 along with said motor and then retightening the thumb screws 27 so that the working bit or tool will be at the proper height and partially or wholly project above the plane of the work table 15.

My novel adjustable jig has the advantage of utilization of electric portable drills as well as electric motors on which chucks are mounted for various routing, molding, shaving, trimming and cutting operations on wood pieces of various widths and sizes; and it is adapted to be relatively quickly and easily adjusted and set in the manner described to fulfill the varying requirements of the aforesaid uses.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In an adjustable device for mounting an electric motor relative to a work table; a recessed work table; upright supports for said work table; an upwardly extending base plate; angular brackets secured to said base plate and slidably and adjustably mounted on said table; a slotted drill mounting base adjustably mounted for upward and downward movement on said base plate; a pair of spaced apart angular clamping arms secured at one end thereof to said drill mounting base, said arms having their outer ends bent angularly and apertured; a bolt in the outer ends of said clamping arms, said arms being adapted to clamp a motor therebetween and said motor being adapted to hold a tool in the recess of said table; the vertical adjustment of said drill mounting base being adapted to adjust vertically the position of said motor; the horizontal adjustment of said base plate and said brackets being adapted to adjust the position of said motor relative to the recess of said table.

2. An adjustable routing and molding jig comprising a work table having an edge-opening recess; a pair of guideplates mounted on the recessed edge of said table; a vertically extending mounting base plate; a pair of angular metal brackets having one leg of each thereof connected to said mounting base plate and the other legs of said brackets being longitudinally slotted; manually adjustable screws threaded in said table and securing said brackets to said table to provide for positioning said base plate at varying distances from said table; a drill mounting base having a pair of parallel vertical slots therein; a pair of adjustable bolts extending through said slots of said mounting base and mounted on said mounting base plate; a pair of frame-like supporting stands for said work table; a V-shaped adjustable clamp having angular apertured legs; bolts connecting said legs of said clamp to said drill mounting base; said clamp being adapted to hold an electric motor and work tool therein in substantially vertical position; said base plate, said drill mounting base and said clamp being adjustable horizontally to selectively position a work tool in and above said table recess; said drill mounting base being vertically adjustable to position a work tool in said drill relative to said work table.

References Cited in the file of this patent

UNITED STATES PATENTS

| | | |
|---|---|---|
| 265,604 | Holt | Oct. 10, 1882 |
| 534,661 | Parmelee et al. | Feb. 26, 1895 |
| 2,799,305 | Groehn | July 16, 1957 |
| 2,918,953 | Wraight | Dec. 29, 1959 |
| 2,919,730 | Joa | Jan. 5, 1960 |

FOREIGN PATENTS

| | | |
|---|---|---|
| 500,889 | Great Britain | Feb. 17, 1939 |